US012057266B2

(12) United States Patent
Su et al.

(10) Patent No.: US 12,057,266 B2
(45) Date of Patent: Aug. 6, 2024

(54) WHEEL CONTROL MECHANISM AND MOUSE DEVICE WITH SAME

(71) Applicant: Primax Electronics Ltd., Taipei (TW)

(72) Inventors: Chun-Nan Su, Taipei (TW); Chun-Che Wu, Taipei (TW); Sheng-An Tsai, Taipei (TW); Ming-Hao Hsieh, Taipei (TW); Li-Kuei Cheng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 227 days.

(21) Appl. No.: 17/944,915

(22) Filed: Sep. 14, 2022

(65) Prior Publication Data

US 2024/0071665 A1   Feb. 29, 2024

(30) Foreign Application Priority Data

Aug. 26, 2022   (TW) .................................. 111132375

(51) Int. Cl.
*H01F 7/02* (2006.01)
*G06F 3/0362* (2013.01)
*G06F 3/0354* (2013.01)
*H02K 7/116* (2006.01)

(52) U.S. Cl.
CPC .............. *H01F 7/02* (2013.01); *G06F 3/0362* (2013.01); *G06F 3/03543* (2013.01); *H02K 7/116* (2013.01)

(58) Field of Classification Search
CPC ........ H01F 7/02; H01F 7/0231; G06F 3/0362; G06F 3/03543; G06F 3/016; H02K 7/116; H02K 2213/09; H02K 49/01
USPC ......................................................... 355/256
See application file for complete search history.

(56) References Cited

U.S. PATENT DOCUMENTS

| 11,061,493 | B1* | 7/2021 | Cheng | G06F 3/0383 |
| 11,099,667 | B1* | 8/2021 | Cheng | G06F 3/0362 |
| 11,175,752 | B1* | 11/2021 | Chu | G06F 3/0362 |
| 11,681,379 | B1* | 6/2023 | Su | G06F 3/016 |
| | | | | 345/163 |
| 11,797,108 | B1* | 10/2023 | Su | G06F 3/016 |
| 2021/0200336 | A1* | 7/2021 | Chiang | G06F 3/03541 |

* cited by examiner

*Primary Examiner* — Shawki S Ismail
*Assistant Examiner* — Lisa N Homza
(74) *Attorney, Agent, or Firm* — KIRTON McCONKIE; Evan R. Witt

(57) ABSTRACT

A wheel control mechanism includes a support base, a wheel module, a first magnetic module and a second magnetic module. The wheel module, the first magnetic module and the second magnetic module are installed on the support base. The first magnetic module generates a magnetic attractive force to attract a metal ratchet of the wheel module. By adjusting the position of the second magnetic module relative to the first magnetic module, the strength of the magnetic attractive force is changed. Consequently, the rotation of the wheel module results in a tactile feel or does not result in the tactile feel.

20 Claims, 11 Drawing Sheets

WHEEL CONTROL MECHANISM AND MOUSE DEVICE WITH SAME

FIELD OF THE INVENTION

The present invention relates to a mechanism of an input device, and more particularly to a control mechanism for a mouse device.

BACKGROUND OF THE INVENTION

A mouse is used to control a cursor on a computer screen in order to operate the computer. Since 1968, the United States has produced the world's first mouse. After then, the mouse is applied to word processing operations, video games, industrial drawings, drawing design or media production. Consequently, the mouse has become an indispensable part of the computer system.

Generally, the operating interface of a mouse comprises a left button, a right button and a scroll wheel. For increasing the convenience and comfort of operating the scroll wheel of the mouse, some technologies have been disclosed. For example, Taiwanese Patent No. 1448928 discloses a wheel module for an input device. One or two different toothed structures are formed in a recess or a hollow groove of the scroll wheel. Moreover, when a swinging arm is contacted with one of the toothed structures, the corresponding tactile feel is generated. Moreover, a hyper-fast roller structure of a mouse device is disclosed in Taiwanese Patent No. M498914. A tooth part and a stopping rod are installed in the wheel module. In case that the stopping rod is pushed by a torsion spring, the stopping rod is in close contact with the tooth part. When a button linked with the stopping rod is operated by the user, the roller is switched between a hyper-fast scrolling mode and an ordinary scrolling mode.

As mentioned above, in the conventional technologies, the wheel module generates more tactile feels by using a contact-type interference method. However, these designs still have some drawbacks. For example, the rotating mode of the wheel module cannot be switched immediately. Moreover, after the scroll wheel has been used for a long time, the contact-type interference method may wear the wheel module. If the wear condition of the wheel module is serious, the rotation of the wheel module cannot generate the tactile feel.

For solving the above drawbacks, it is important to provide a wheel control mechanism for quickly switching the rotating mode of a wheel module and reducing the wear problem of the wheel module.

SUMMARY OF THE INVENTION

The present invention provides a wheel control mechanism for quickly adjusting a rotating mode of a wheel module and effectively reducing the wear condition of the wheel module.

In accordance with an aspect of the present invention, a wheel control mechanism for a mouse device is provided. The wheel control mechanism includes a support base, a wheel module, a first magnetic module and a second magnetic module. The support base includes a first supporting part, a second supporting part and a third supporting part, which are combined together. The wheel module is rotatably installed on the first supporting part. The wheel module includes a wheel body and a metal ratchet. The wheel body includes a rotary shaft. The metal ratchet is connected with the rotary shaft. The metal ratchet is synchronously rotated with the wheel body. The first magnetic module installed on the second supporting part. The first magnetic module includes a first magnetic element, a first magnetic conductor and a second magnetic conductor. The first magnetic element is arranged between the first magnetic conductor and the second magnetic conductor. Each of the first magnetic conductor and the second magnetic conductor includes a first end and a second end opposed to the first end. The first end of the first magnetic conductor and the first end of the second magnetic conductor are aligned with a periphery region of the metal ratchet. Moreover, a magnet accommodating space is formed between the second end of the first magnetic conductor and the second end of the magnetic conductor. The second magnetic module includes an adjustment element, a swinging element, a second magnetic element and a third magnetic element. The adjustment element is pivotally coupled to the third supporting part. The swinging element is connected with the adjustment element and aligned with the magnet accommodating space. The second magnetic element is installed on an end of the swinging element away from the adjustment element. The third magnetic element is installed on another end of the swinging element away from the adjustment element. The second magnetic element and the third magnetic element are swingable along a same path. When the adjustment element drives the swinging element to swing, the second magnetic element and the third magnetic element are selectively introduced into the magnet accommodating space or departed from the magnet accommodating space. If the second magnetic element is introduced into the magnet accommodating space and like poles of the second magnetic element and the first magnetic element face each other, magnetic attractive forces generated at the first end of the first magnetic conductor and the first end of the second magnetic conductor attract the metal ratchet. Consequently, a rotation of the wheel body results in a tactile feel. If the third magnetic element is introduced into the magnet accommodating space and unlike poles of the third magnetic element and the first magnetic element face each other, the magnetic attractive forces generated at the first end of the first magnetic conductor and the first end of the second magnetic conductor are attenuated. Consequently, the rotation of the wheel body does not result in the tactile feel.

In an embodiment, the periphery region of the metal ratchet has a toothed structure, and the toothed structure includes plural convex parts and plural concave parts. The plural convex parts and the plural concave parts are alternatively arranged on the periphery region of the metal ratchet.

In an embodiment, the first end of the first magnetic conductor and the first end of the second magnetic conductor include claw structures, and the claw structures are aligned with the corresponding convex parts.

In an embodiment, the first magnetic conductor and the second magnetic conductor are silicon steel sheets.

In an embodiment, the first magnetic element, the second magnetic element and the third magnetic element are strong magnets.

In an embodiment, the adjustment element includes a shaft part and an adjusting part. The adjusting part is connected with a first end of the shaft part. The swinging element is radially connected with a second end of the shaft part, which is opposed to the first end of the shaft part. Through the shaft part, the adjusting part drives the swinging element to swing.

In an embodiment, the third supporting part includes a support structure. The support structure is externally protruded from a side of the third supporting part. The shaft part is penetrated through the support structure.

In an embodiment, the third supporting part further includes an avoidance recess, and the avoidance recess is concavely formed in a side of the support structure. the avoidance recess is aligned with the swinging element. The swinging element is permitted to be received within the avoidance recess.

In an embodiment, the mouse device includes a casing. The casing includes an upper cover and a lower cover, which are combined together.

In an embodiment, the adjusting part has a knob structure, and the lower cover includes an adjusting hole corresponding to the adjusting part. The knob structure is exposed outside the adjusting hole.

In an embodiment, the support base further includes at least two fixing parts, and the at least two fixing parts are fixed on the lower cover.

In an embodiment, an operation end of the upper cover has an opening corresponding to the wheel body. A portion of the wheel body is exposed outside the opening.

In an embodiment, the adjusting part is an adjusting gear.

In an embodiment, the wheel control mechanism further includes a driving module. The driving module includes a driving motor and a transmission gear set. The transmission gear set is connected with the driving motor. The transmission gear set is engaged with the adjusting gear to drive the adjustment element.

In an embodiment, the support base further includes a fourth supporting part beside the third supporting part, and the driving module is installed on the fourth supporting part.

In an embodiment, the fourth supporting part includes an accommodation recess, and the driving motor is accommodated within the accommodation recess.

In an embodiment, the wheel control mechanism further includes a rotating speed detector that detects a rotating speed of the wheel body. The metal ratchet and the rotating speed detector are respectively installed on opposite sides of the wheel body.

In an embodiment, the rotating speed detector is electrically connected with the driving module. The second magnetic element or the third magnetic element is selectively introduced into the magnet accommodating space by the driving module according to the rotating speed of the wheel body.

In an embodiment, the second supporting part includes an installation recess and a covering plate. The first magnetic module is disposed within the installation recess. The installation recess is covered by and combined with the covering plate.

In an embodiment, the covering plate includes a notch corresponding to the magnet accommodating space.

From the above descriptions, the present invention provides the wheel control mechanism. In the wheel control mechanism, the rotating mode of the wheel module is adjusted according to the interaction between the first magnetic module and the second magnetic module in a non-contact manner. Consequently, the wheel body of the wheel module can be rotated in the non-tactile manner or the multi-tactile manner. When compared with the conventional technology of using the contact-type interference method to adjust the rotating mode of the wheel module, the interaction between the first magnetic module and the second magnetic module in the non-contact manner can not only switch the rotating mode of the wheel module more quickly, but also reduce the wear condition of the wheel module.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
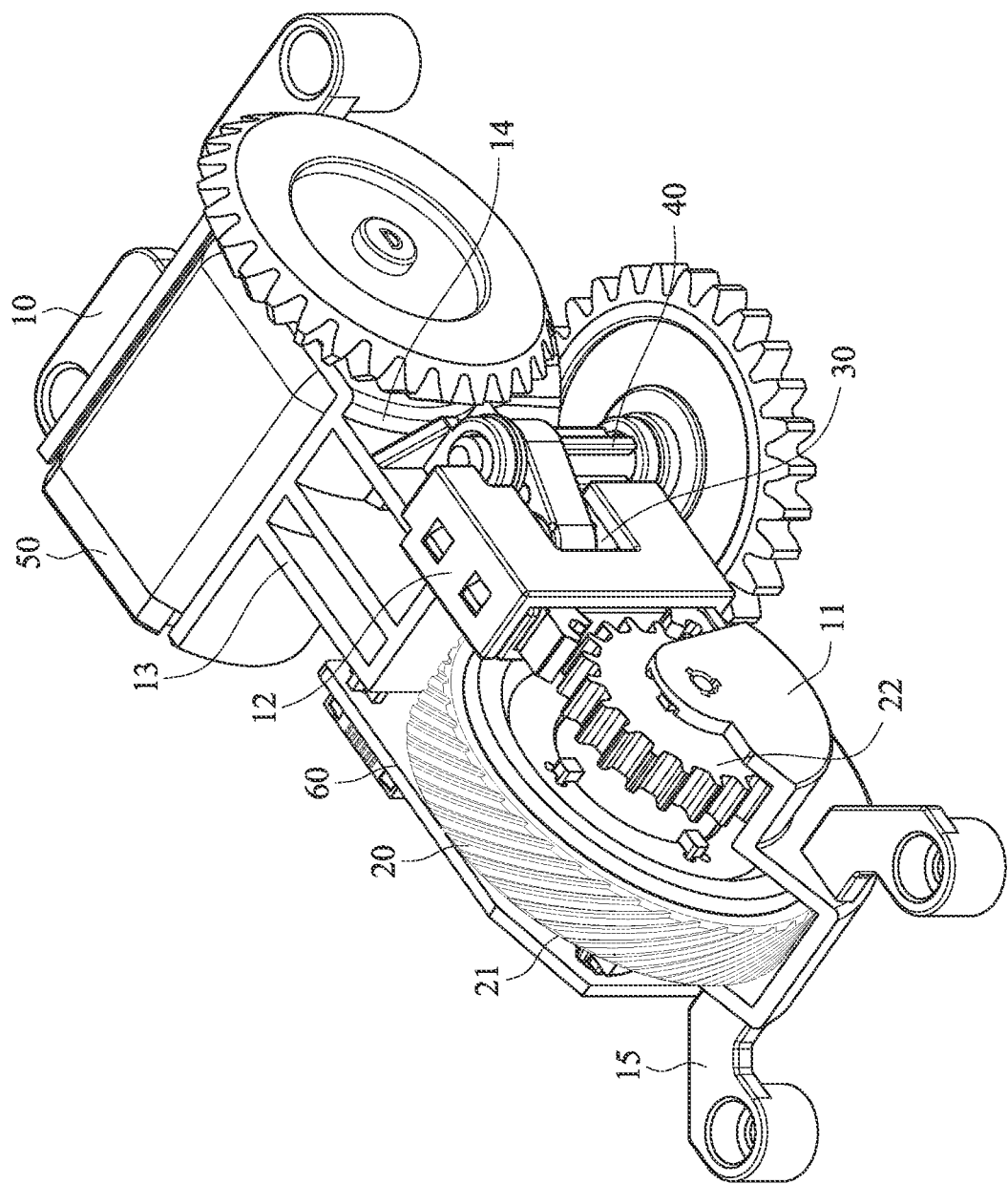
FIG. 1A is a schematic perspective view illustrating a wheel control mechanism according to an embodiment of the present invention and taken along a viewpoint.
Figure 1B:
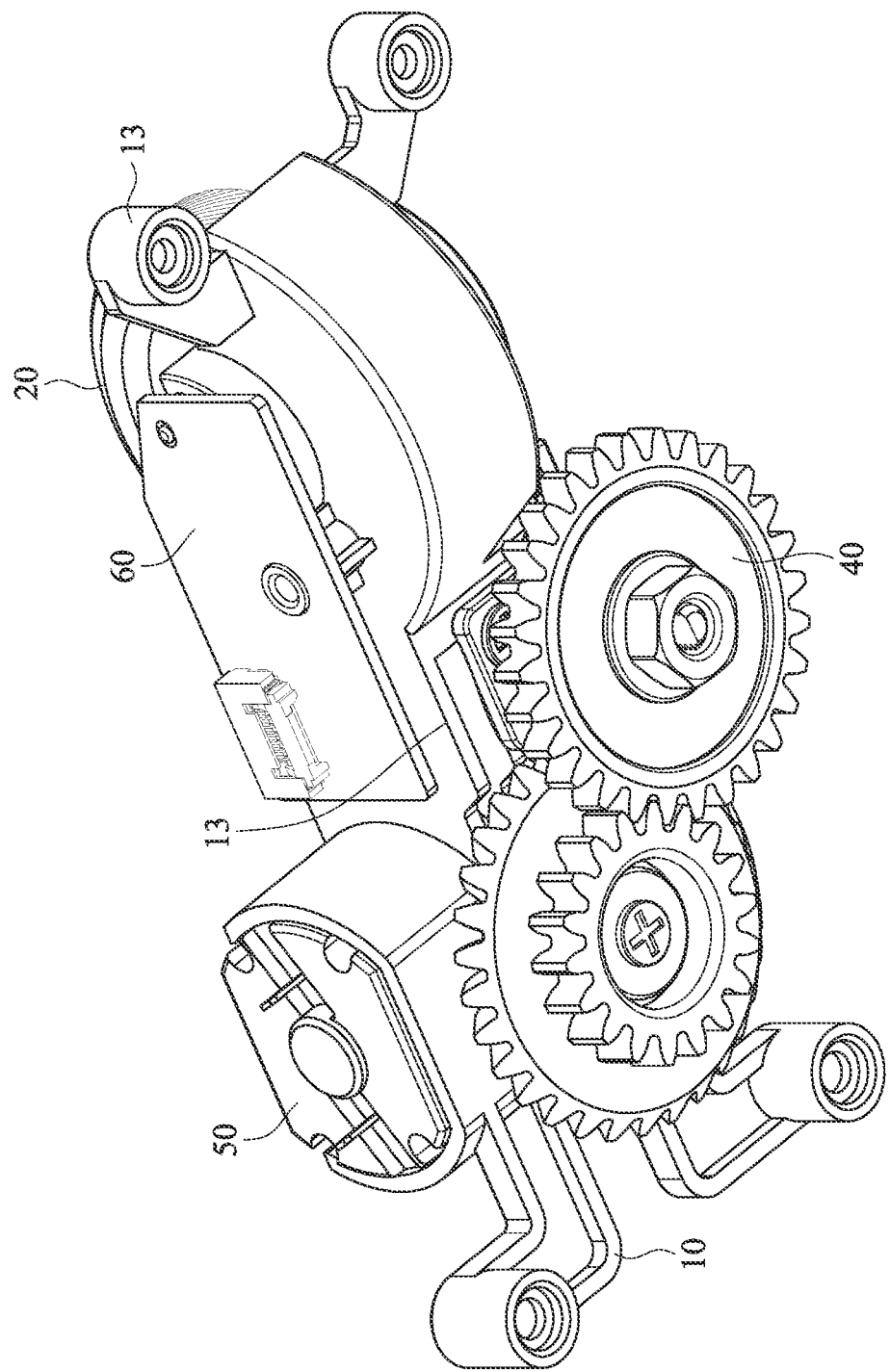
FIG. 1B is a schematic perspective view illustrating the wheel control mechanism according to the embodiment of the present invention and taken along another viewpoint.
Figure 1C:
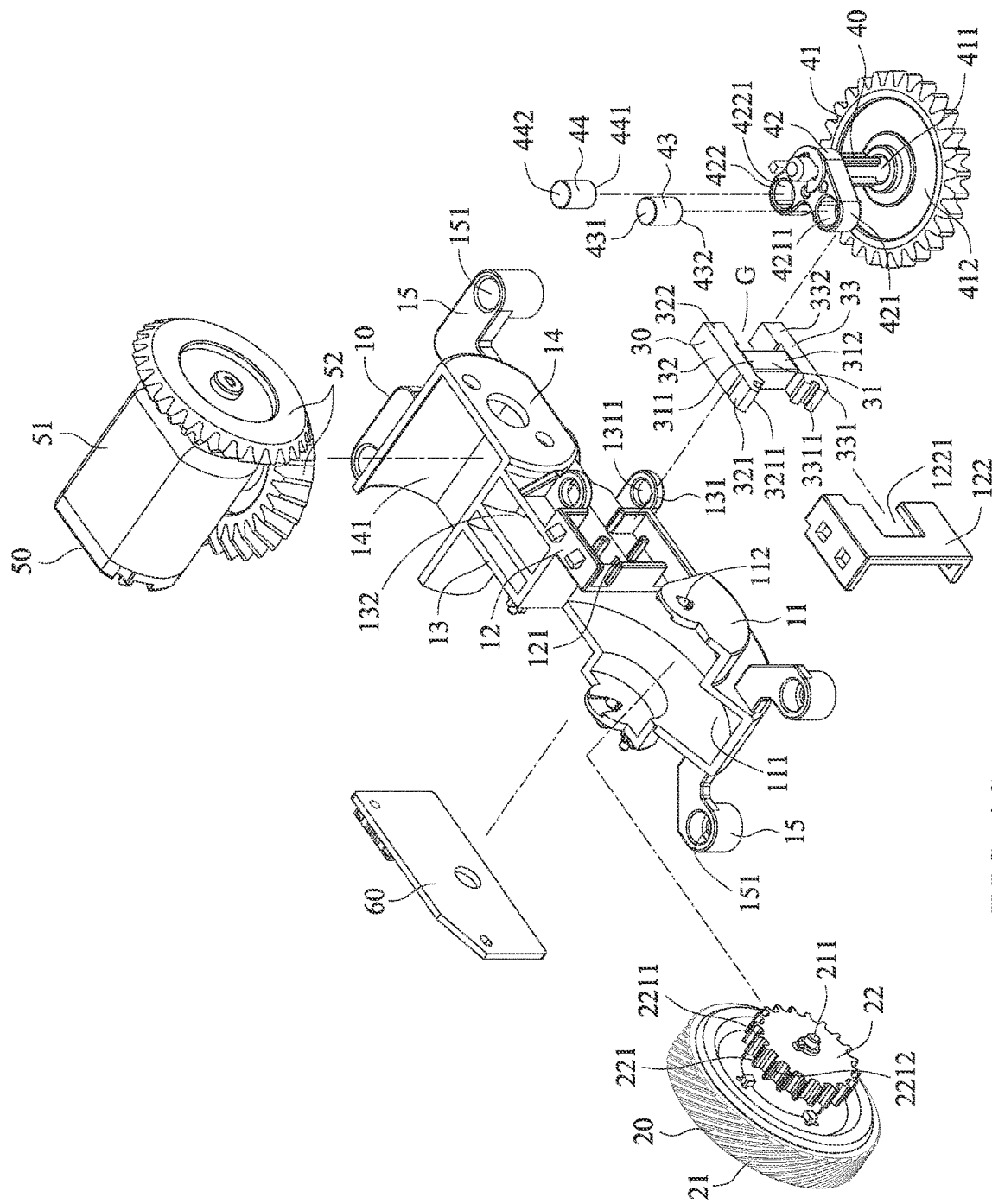
FIG. 1C is a schematic exploded view illustrating the wheel control mechanism according to the embodiment of the present invention.
Figure 1D:
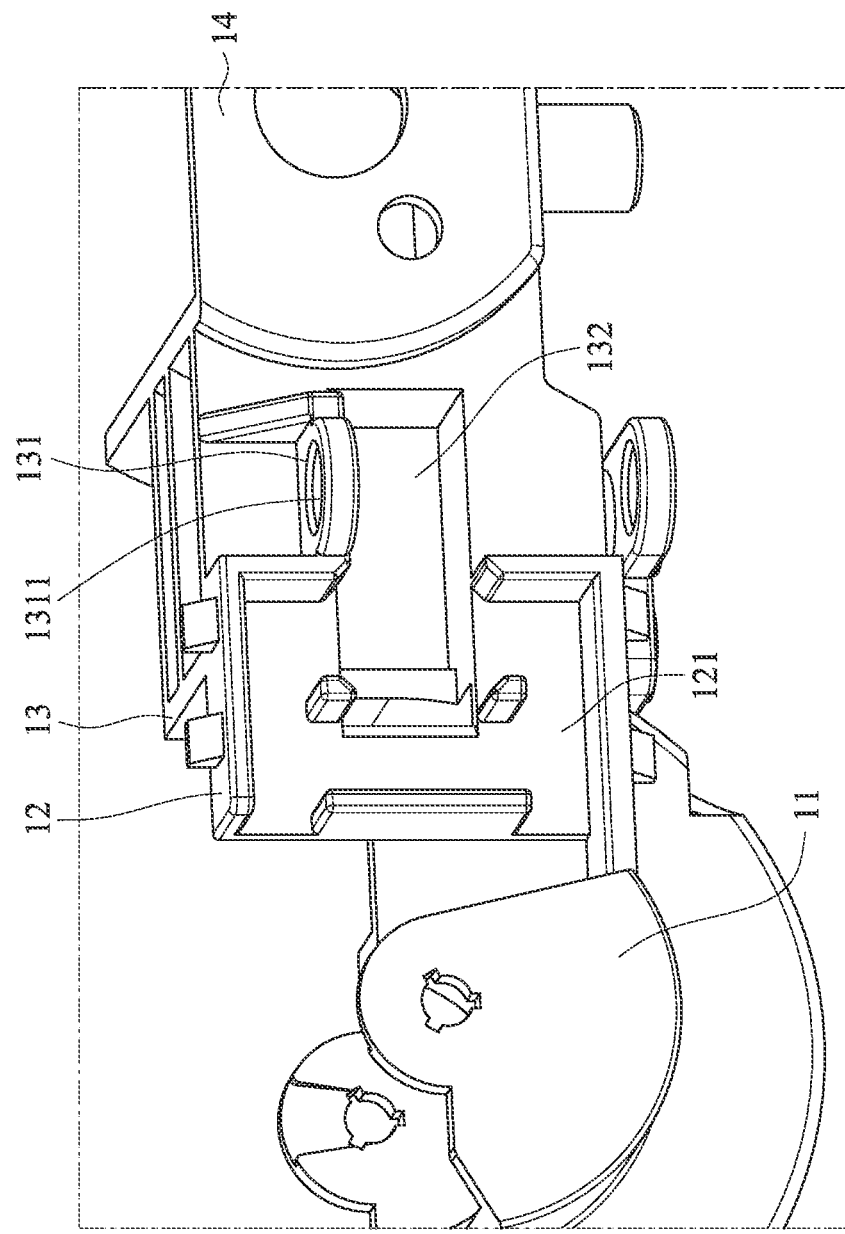
FIG. 1D is a schematic enlarged view illustrating a portion of the wheel control mechanism according to the embodiment of the present invention.

Please refer to FIGS. 1A, 1B, 1C and 1D. FIG. 1A is a schematic perspective view illustrating a wheel control mechanism according to an embodiment of the present invention and taken along a viewpoint. FIG. 1B is a schematic perspective view illustrating the wheel control mechanism according to the embodiment of the present invention and taken along another viewpoint. FIG. 1C is a schematic exploded view illustrating the wheel control mechanism according to the embodiment of the present invention. FIG. 1D is a schematic enlarged view illustrating a portion of the wheel control mechanism according to the embodiment of the present invention.

In an embodiment, the wheel control mechanism RS comprises a support base 10, a wheel module 20, a first magnetic module 30, a second magnetic module 40, a driving module 50 and a rotating speed detector 60.

The support base 10 comprises a first supporting part 11, a second supporting part 12, a third supporting part 13, a fourth supporting part 14 and two fixing part 15, which are combined together. The wheel module 20, the first magnetic module 30, the second magnetic module 40 and the driving module 50 are installed on the first supporting part 11, the second supporting part 12, the third supporting part 13 and the fourth supporting part 14, respectively.

Please refer to FIG. 1C. The first supporting part 11 comprises a receiving recess 111 and two first pivotal holes 112. The two first pivotal holes 112 are respectively formed in two opposite lateral walls of the receiving recess 111. The wheel module 20 comprises a wheel body 21 and a metal ratchet 22. The wheel body 21 comprises a rotary shaft 211. The metal ratchet 22 is installed on a first side of the wheel body 21. Moreover, the metal ratchet 22 is connected with the rotary shaft 211. Consequently, the metal ratchet 22 can be synchronously rotated with the wheel body 21. A portion of the wheel module 20 is accommodated within the receiving recess 111. The rotary shaft 211 of the wheel module 20 is inserted into the first pivotal holes 112. Consequently, the wheel module 20 can be rotatably installed on the first supporting part 11. Moreover, the rotating speed detector 60 is installed on a second side of the wheel body 21, which is opposed to the first side of the wheel body 21. The rotating speed detector 60 is used for detecting the rotating speed of the wheel body 21 and generating a corresponding control signal. In an embodiment, a periphery region of the metal ratchet 22 has a toothed structure 221. In addition, the toothed structure 221 comprises plural convex parts 2211 and plural concave parts 2212, which are alternatively arranged on the periphery region of the metal ratchet 22.

The second supporting part 12 comprises an installation recess 121 and a covering plate 122. The installation recess 121 is covered by the covering plate 122. The first magnetic module 30 is disposed within the installation recess 121. Moreover, a notch 1221 is formed in a side of the covering plate 122.

The first magnetic module 30 comprises a first magnetic element 31 and two magnetic conductors 32 and 33. The first magnetic element 31 comprises an N-pole terminal 311 and an S-pole terminal 312. The magnetic conductor 32 comprises a first end 321 and a second end 322, which are opposed to each other. The magnetic conductor 33 comprises a first end 331 and a second end 332, which are opposed to each other. The first end 321 of the magnetic conductor 32 has a claw structure 3211. The first end 331 of the magnetic conductor 33 has a claw structure 3311. Moreover, a magnet accommodating space G is formed between the second end 322 of the magnetic conductor 32 and the second end 332 of the magnetic conductor 33.

The first magnetic element 31 is arranged between the magnetic conductor 32 and the magnetic conductor 33. Consequently, the magnetic field line produced by the first magnetic element 31 can pass through the magnetic conductor 32 and the magnetic conductor 33. In this embodiment, the N-pole terminal 311 of the first magnetic element 31 is in close contact with the magnetic conductor 32, and the S-pole terminal 312 of the first magnetic element 31 is in close contact with the magnetic conductor 33. Moreover, the first magnetic element 31 is a strong magnet, and the two magnetic conductors 32 and 33 are silicon steel sheets.

When the first magnetic module 30 is installed in the installation recess 121, the first end 321 of the magnetic conductor 32 and the first end 331 of the magnetic conductor 33 are protruded outside the installation recess 121 and located near the periphery region of the metal ratchet 22. Moreover, the claw structure 3211 and the claw structure 3311 are aligned with the corresponding convex parts 2211 of the toothed structure 221. Moreover, after the installation recess 121 is covered by the covering plate 122, the notch 1221 is aligned with the magnet accommodating space G between the second end 322 of the magnetic conductor 32 and the second end 332 of the magnetic conductor 33. In this embodiment, each of the claw structures 3211 and 3311 has two claw parts corresponding to two adjacent convex parts 2211 of the toothed structure 221. It is noted that numerous modifications and alterations may be made while retaining the teachings of the invention. For example, in another embodiment, both sides of each of the claw structures 3211 and 3311 are expanded, and thus each of the claw structures 3211 and 3311 comprises more than two claw parts corresponding to more than two convex parts 2211. Consequently, the magnetic attractive forces generated at the first end 321 of the magnetic conductor 32 and the first end 331 of the magnetic conductor 33 will be strengthened.

The third supporting part 13 and the first magnetic module 30 are located at the same side. The third supporting part 13 comprises a support structure 131 and an avoidance recess 132 (see FIG. 1D). The support structure 131 is externally protruded from the third supporting part 13. The avoidance recess 132 is concavely formed. The support structure 131 is a protrusion ear structure. Moreover, the support structure 131 comprises two second pivotal holes 1311, which are opposed to each other.

The second magnetic module 40 comprises an adjustment element 41, a swinging element 42, a second magnetic element 43 and a third magnetic element 44. The adjustment element 41 comprises a shaft part 411 and an adjusting part 412. The adjusting part 412 is connected with a first end of the shaft part 411. The swinging element 42 is connected with a second end of the shaft part 411 in the radial direction. The second end of the shaft part 411 is opposed to the first end of the shaft part 411 that is connected with the adjusting part 412. Consequently, the adjusting part 412 can drive the swinging action of the swinging element 42 through the shaft part 411. In this embodiment, the adjusting part 412 is an adjusting gear with a toothed structure. Moreover, the swinging element 42 has a V-shaped rod structure. The swinging element 42 comprises two rod ends 421 and 422 away from the shaft part 411. The two rod ends 421 and 422 have two installation holes 4211 and 4221, respectively. The distance between the installation hole 4211 and the shaft part 411 and the distance between the installation hole 4221 and the shaft part 411 are identical. It is noted that the structure of the swinging element 42 is not restricted to the V-shaped rod structure. In some possible embodiments, the swinging element 42 has a sector structure. That is, the structure of the swinging element 42 may be varied according to the practical requirements.

The second magnetic element 43 and the third magnetic element 44 are installed in the installation holes 4211 and 4222, respectively. Consequently, the second magnetic element 43 and the third magnetic element 44 can be swung along the same path. In this embodiment, the second magnetic element 43 and the third magnetic element 44 are strong magnets. Moreover, unlike poles of the second magnetic element 43 and the third magnetic element 44 are aligned with each other. For example, an N-pole terminal 431 of the second magnetic element 43 is located at the top side, and an S-pole terminal 432 of the second magnetic element 43 is located at the bottom side. Moreover, an N-pole terminal 441 of the third magnetic element 44 is located at the bottom side, and an S-pole terminal 442 of the third magnetic element 44 is located at the top side.

A process of installing the second magnetic module 40 will be described as follows. Firstly, the shaft part 411 of the adjustment element 41 is penetrated through the second pivotal holes 1311 of the support structure 131 of the third supporting part 13. Consequently, the adjustment element 41 is pivotally coupled to the third supporting part 13. Moreover, the swinging element 42 is aligned with the magnet accommodating space G and the avoidance recess 132. Consequently, the swinging element 42 can be moved along the path of the magnet accommodating space G and the avoidance recess 132. When the adjustment element 41 drives the swinging element 42 to swing, the second magnetic element 43 and the third magnetic element 44 can be introduced into the magnet accommodating space G or departed from the magnet accommodating space G, or the entire or a portion of the swinging element 42 is received within the avoidance recess 132.

The fourth supporting part 14 comprises an accommodation recess 141. The driving module 50 comprises a driving motor 51 and a transmission gear set 52. The transmission gear set 52 is connected with the driving motor 51. The driving motor 51 of the driving module 50 is accommodated within the accommodation recess 141. When the driving motor 51 is accommodated within the accommodation recess 141, the transmission gear set 52 is engaged with the adjusting part 412 (i.e., the adjusting gear). In this embodiment, the driving module 50 is installed on the support base 10. It is noted that the installation position of the driving module 50 is not restricted. For example, in case that the wheel control mechanism RS is applied to a mouse device, the driving module 50 may be installed at any position on a casing (not shown) of the mouse device. Moreover, the transmission gear set 52 is engaged with the adjusting part 412.

The wheel control mechanism RS is fixed on the casing or a main circuit board (not shown) of the mouse device through the two fixing parts 15. In this embodiment, the two fixing parts 15 are located beside the first supporting part 11 and the fourth supporting part 14, respectively. Moreover, each of the two fixing parts 15 has at least one fastening hole 151. After a fastening element such as a screw (not shown) is penetrated through the fastening hole 151, the corresponding fixing part 15 is tightened into the casing or the main circuit board of the mouse device.

Figure 2A:
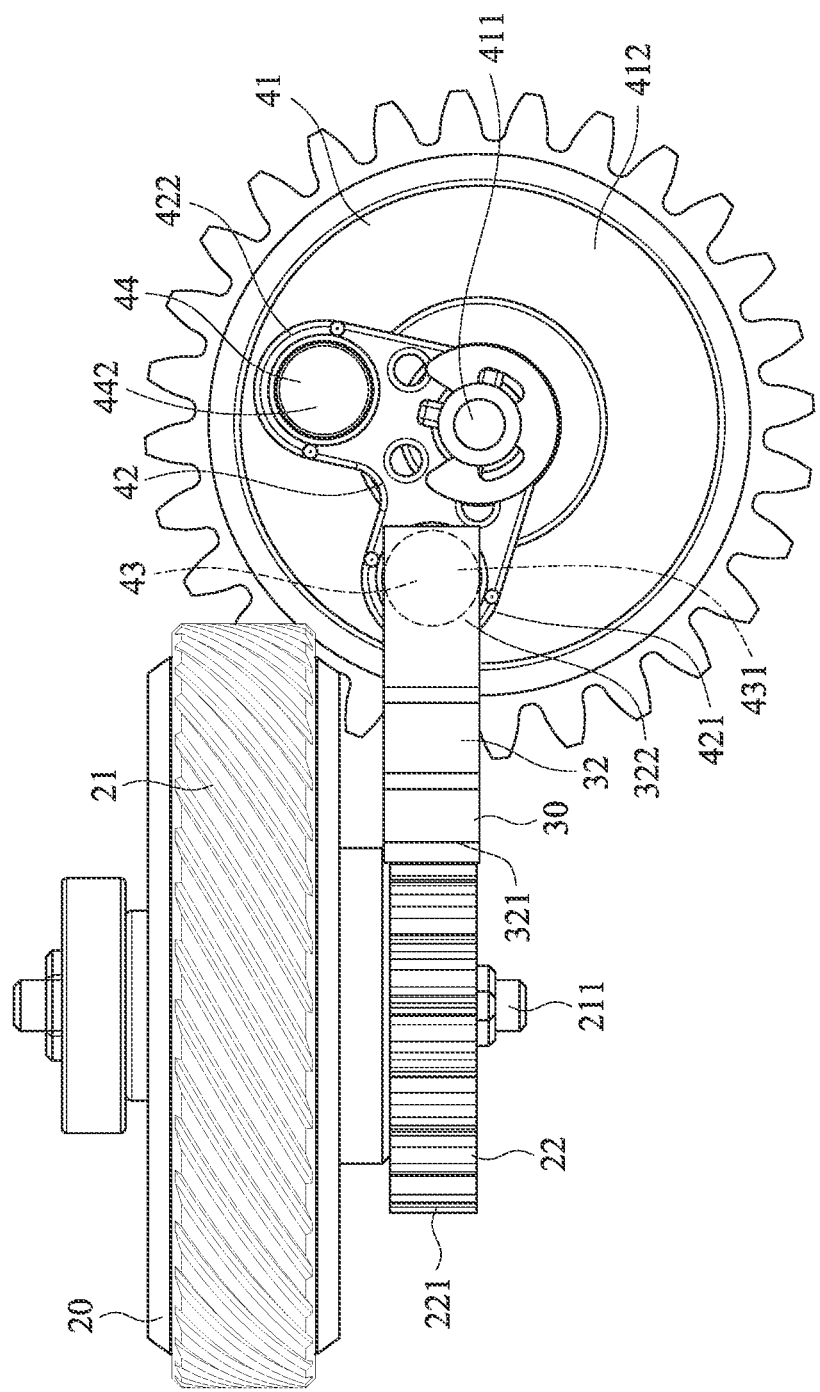
FIGS. 2A and 2B are schematic top views illustrating the operations of the wheel control mechanism according to the embodiment of the present invention.
Figure 2B:
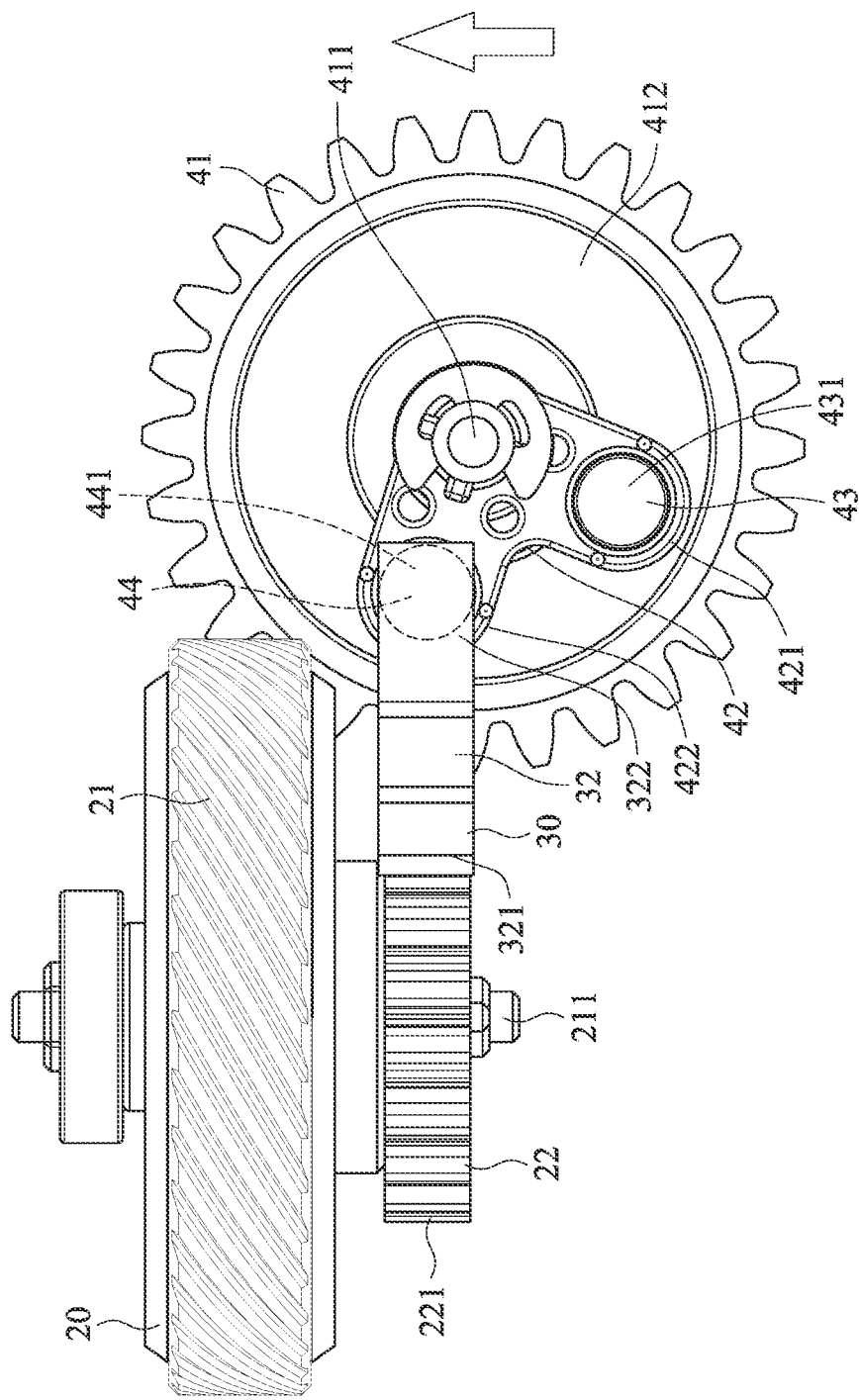
Figure 3A:
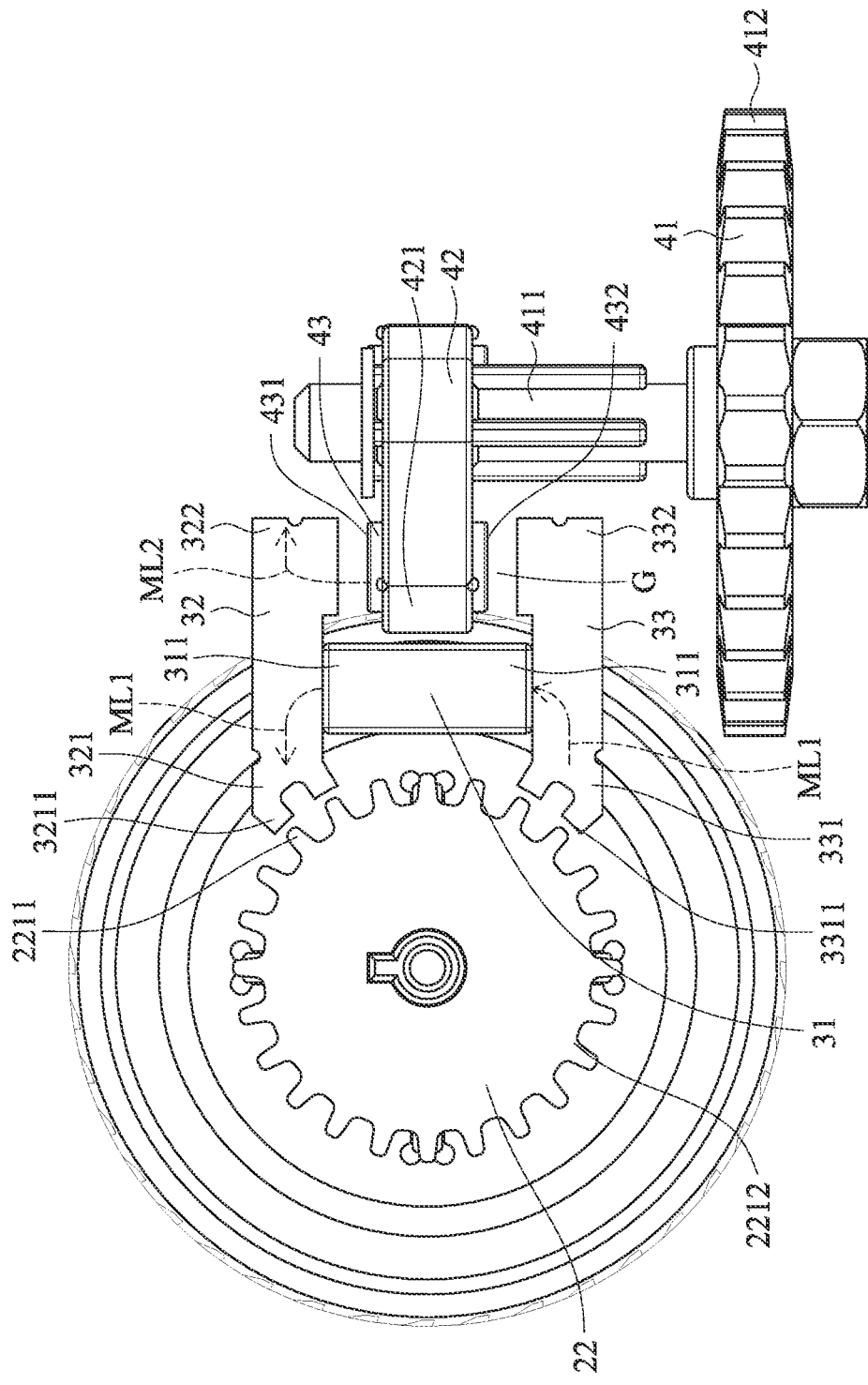
FIGS. 3A and 3B are schematic side views illustrating the operations of the wheel control mechanism according to the embodiment of the present invention.
Figure 3B:
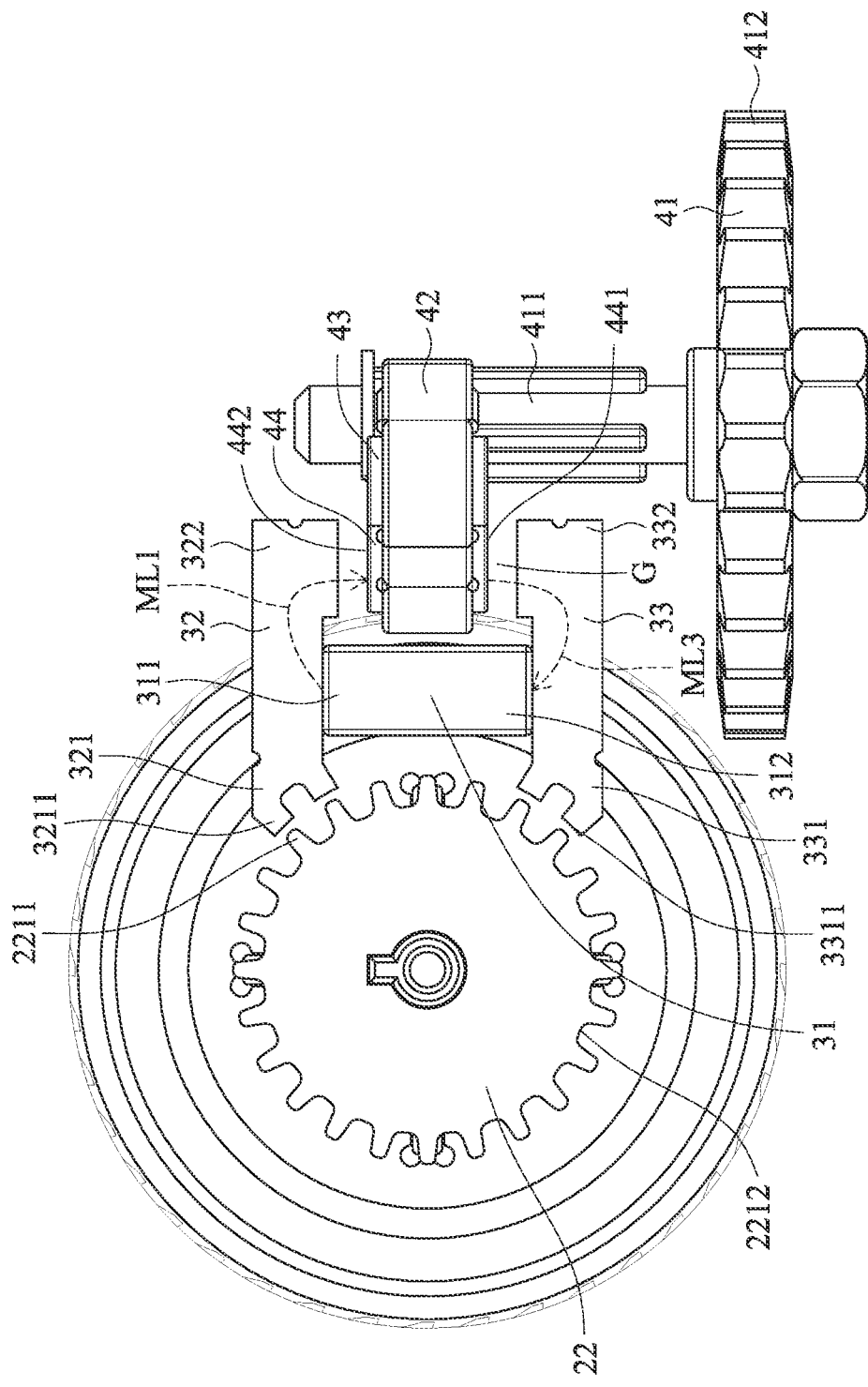

Please refer to FIGS. 2A, 2B, 3A and 3B. FIGS. 2A and 2B are schematic top views illustrating the operations of the wheel control mechanism according to the embodiment of the present invention. FIGS. 3A and 3B are schematic side views illustrating the operations of the wheel control mechanism according to the embodiment of the present invention.

Please refer to FIGS. 2A and 3A. In this situation, the adjustment element 41 drives the swinging element 42 to swing, and the second magnetic element 43 is introduced into the magnet accommodating space G. Moreover, like poles of the second magnetic element 43 and the first magnetic element 31 are aligned with each other. That is, the N-pole terminal 311 of the first magnetic element 31 and the N-pole terminal 431 of the second magnetic element 43 are aligned with each other, and the S-pole terminal 312 of the first magnetic element 31 and the S-pole terminal 432 of the second magnetic element 43 are aligned with each other. Consequently, the third magnetic element 44 and the first magnetic element 31 are magnetically repulsed by each other. Under this circumstance, the magnetic field line ML1 emitted by the N-pole terminal 311 of the first magnetic element 31 and the magnetic field line ML2 emitted by the N-pole terminal 431 of the second magnetic element 43 repel each other. Consequently, the magnetic field produced by the first magnetic element 31 is deflected to the first end 321 of the magnetic conductor 32 and the first end 331 of the magnetic conductor 33. Under this circumstance, the first end 321 of the magnetic conductor 32 and the first end 331 of the magnetic conductor 33 generate the magnetic attractive forces to attract the metal ratchet 22. As a consequence, the rotating speed of the metal ratchet 22 is reduced.

As shown in the drawings, the gap between each of the claw structures 3211 and 3311 at the first ends 321 and 331 of the magnetic conductors 32 and 33 and the corresponding convex part 2211 of the toothed structure 221 is smaller than the gap between each of the claw structures 3211 and 3311 at the first ends 321 and 331 of the magnetic conductors 32 and 33 and the corresponding concave part 2212 of the toothed structure 221. While the metal ratchet 22 is rotated, the relation between any position of the toothed structure 221 of the metal ratchet 22 and the claw structures 3211 and 3311 is dynamically changed. At the moment when the claw structures 3211 and 3311 face the corresponding convex parts 2211 in the rotating process of the metal ratchet 22, the strengths of the generated magnetic attractive forces are larger. In response to the larger strengths of the generated magnetic attractive forces, the rotating speed of the wheel body 21 is instantly reduced. Due to this structural design, the rotation of the wheel body 21 can result in the tactile feel.

In some possible embodiments, the spacing interval between every two adjacent convex parts 2211 is adjusted. For example, the size of the concave part 2212 is increased or decreased. Consequently, the tactile feel generated in response to the rotation of the wheel body 21 is correspondingly adjusted.

In some other embodiments, plural magnetic elements with different magnetic field strengths are installed on the swinging element 42. Moreover, the like poles of each of the plural magnetic elements and the first magnetic element 31 are aligned with each other. Originally, one of the plural magnetic elements is placed in the magnet accommodating space G. As the swinging element 42 is swung and a different magnetic element of the plural magnetic elements is introduced into the magnet accommodating space G, the strengths of the magnetic attractive forces at the first ends 321 and 331 of the magnetic conductors 32 and 33 are correspondingly changed. Due to this structural design, the rotation of the wheel body 21 can result in one of plural different tactile feels.

One the other hand, if the adjustment element 41 drives the swinging element 42 to swing and both of the two rod ends 421 and 422 of the swinging element 42 are departed from the magnet accommodating space G, for example the swinging element 42 is completely received within the avoidance recess 132 (see FIG. 1D), the magnetic field produced by the first magnetic element 31 is not deflected. Under this circumstance, the strengths of the magnetic attractive force at the first ends 321 and 331 of the magnetic conductors 32 and 33 are relatively weak. Consequently, while the wheel body 21 is rotated, the tactile feel is less obvious.

Please refer to FIGS. 2B and 3B again. While the transmission gear set 52 of the driving module 50 as shown in FIG. 1C is rotated in a counterclockwise direction to drive the rotation of the adjusting part 412 of the adjustment element 41, the shaft part 411 drives the swinging element 42 to swing. Consequently, the second magnetic element 43 is departed from the magnet accommodating space G, and the third magnetic element 44 is introduced into the magnet accommodating space G. Moreover, the unlike poles of the third magnetic element 44 and the first magnetic element 31 are aligned with each other. That is, the N-pole terminal 311 of the first magnetic element 31 and the S-pole terminal 442 of the third magnetic element 44 are aligned with each other, and the S-pole terminal 312 of the first magnetic element 31 and the N-pole terminal 441 of the third magnetic element 44 are aligned with each other. Consequently, the third magnetic element 44 and the first magnetic element 31 are magnetically attracted by each other. Under this circumstance, the magnetic field line ML1 emitted by the N-pole terminal 311 of the first magnetic element 31 is introduced into the S-pole terminal 442 of the third magnetic element 44, and the magnetic field line ML3 emitted by the N-pole terminal 441 of the third magnetic element 44 is introduced into the S-pole terminal 312 of the first magnetic element 31. In other words, a closed-loop magnetic field is generated by the first magnetic element 31 and the third magnetic element 44 collaboratively. Since the magnetic attractive forces at the first end 321 of the magnetic conductor 32 and the first end 331 of the magnetic conductor 33 are attenuated, the wheel body 21 can be smoothly rotated without resulting in the tactile feel.

Please refer to FIGS. 2A, 2B, 3A and 3B again. In some possible embodiments, the rotating speed detector 60 as shown in FIG. 1C is electrically connected with the driving module 50 directly, or the rotating speed detector 60 is electrically connected with the driving module 50 through the main circuit board (not shown) of the mouse device indirectly. The detected rotating speed information is transmitted from the rotating speed detector 60 to the driving module 50 or the main circuit board (not shown) of the mouse device. Consequently, the driving module 50 can switch the second magnetic module 40 according to the rotating speed of the to the wheel body 21. For example, if the wheel body 21 is rotated by the quickly and the rotating speed of the wheel body 21 is higher than a predetermined speed threshold, it means that the user intends to quickly rotate the wheel body 21. That is, the wheel body 21 needs to be operated in a hyper-fast scrolling mode, and thus plural pages shown on the display screen can be browsed quickly. For achieving this purpose, the driving module 50 drives the switching action of the adjusting element 41 and the third magnetic element 44 is introduced into the magnet accommodating space G. Since the magnetic attractive forces at the first end 321 of the magnetic conductor 32 and the first end 331 of the magnetic conductor 33 are attenuated, the wheel body 21 can be smoothly rotated without resulting in the tactile feel.

Whereas, if the rotating speed of the wheel body 21 is lower than the predetermined speed threshold, it means that the user does not intend to quickly rotate the wheel body 21. For achieving this purpose, the driving module 50 drives the adjusting element 41 and the second magnetic element 43 is introduced into the magnet accommodating space G. Since the magnetic attractive forces at the first end 321 of the magnetic conductor 32 and the first end 331 of the magnetic conductor 33 are strengthened, the rotation of the wheel body 21 can result in the tactile feel.

Figure 4A:
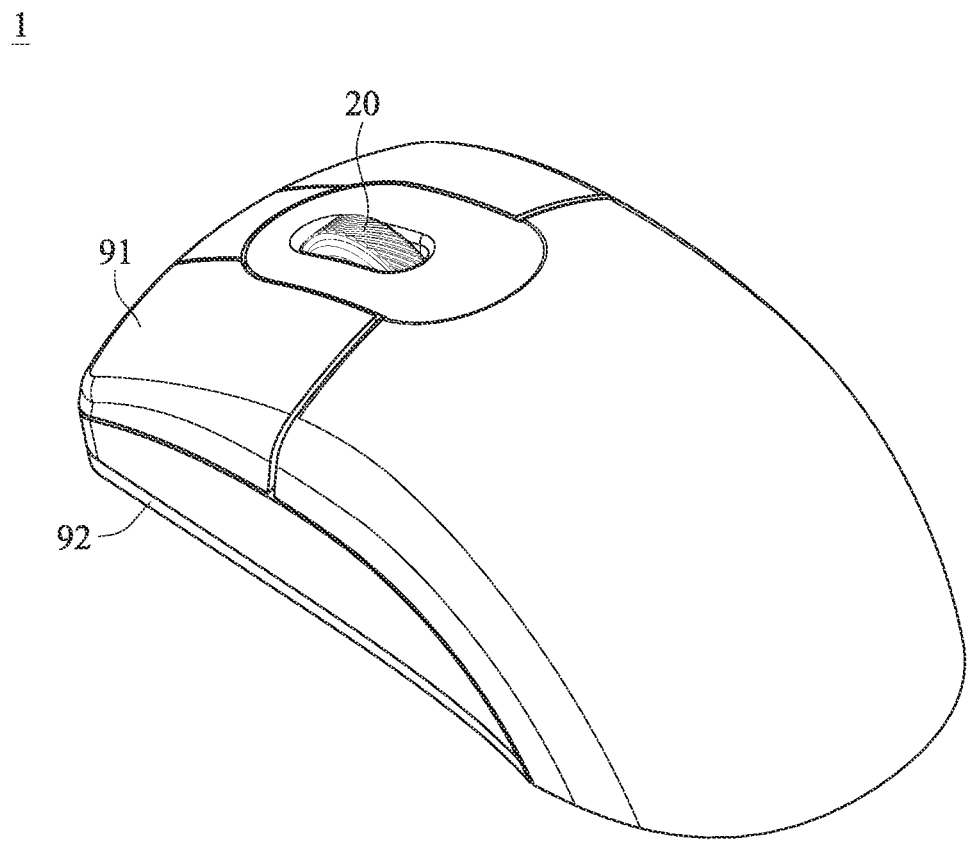
FIG. 4A is a schematic perspective view illustrating the appearance of a mouse device according to a first embodiment of the present invention.
Figure 4B:
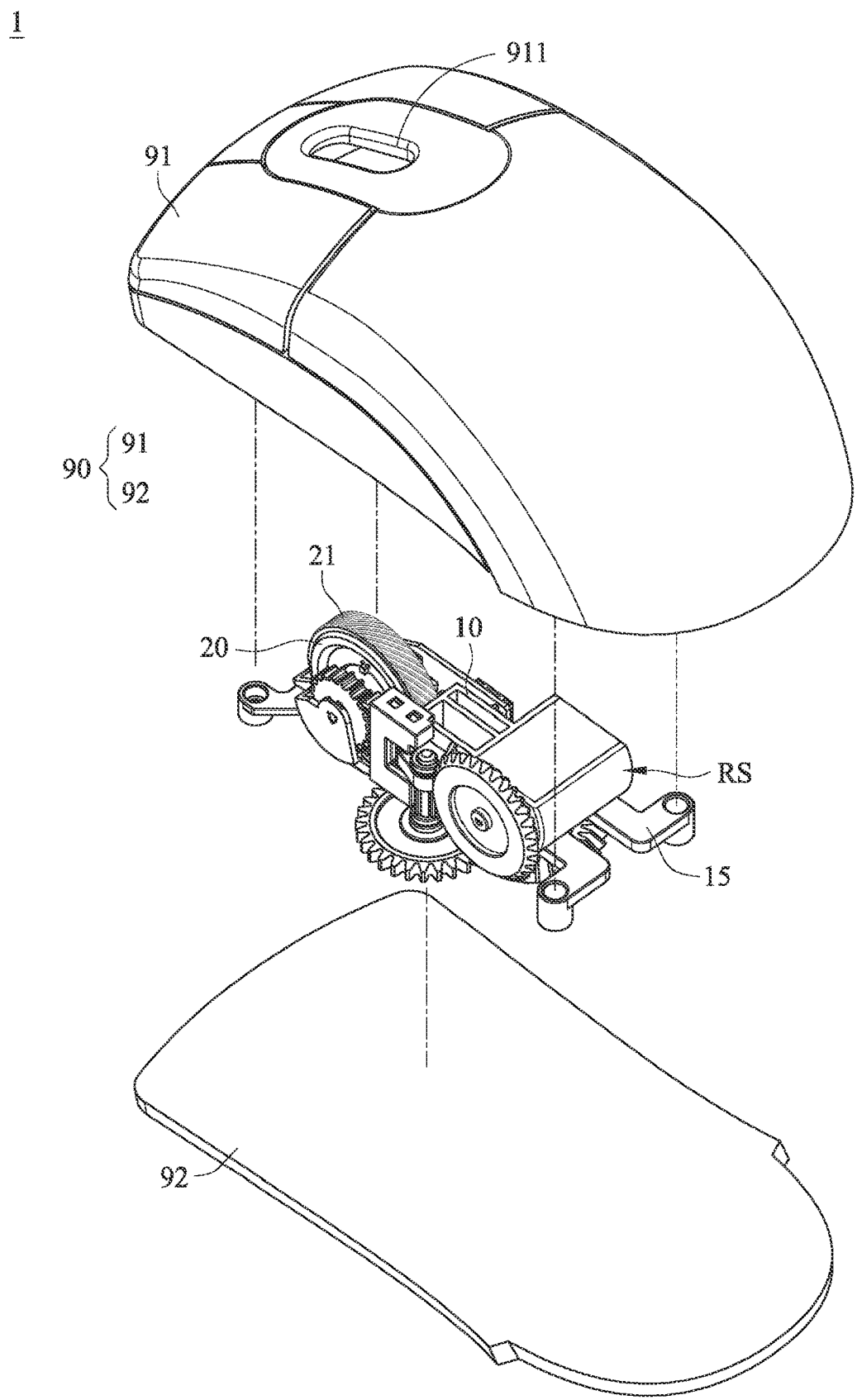
FIG. 4B is a schematic exploded view illustrating the mouse device according to the first embodiment of the present invention.

Please refer to FIGS. 4A and 4B. FIG. 4A is a schematic perspective view illustrating the appearance of a mouse device according to a first embodiment of the present invention. FIG. 4B is a schematic exploded view illustrating the mouse device according to the first embodiment of the present invention. In this embodiment, the mouse device 1 comprises a casing 90 and the wheel control mechanism RS. For succinctness, a switch module corresponding to the left and right buttons, a main circuit board and an inner circuit of the mouse device are not shown in the exploded view. The casing 90 comprises an upper cover 91 and a lower cover 92, which are combined together. An operation end of the upper cover 91 has an opening 911. The wheel control mechanism RS is fixed on the lower cover 92 through the two fixing parts 15 of the support base 10. The wheel body 21 of the wheel module 20 is aligned with the opening 911. Moreover, a portion of the wheel body 21 is exposed outside the opening 911. Consequently, the wheel body 21 can be rotated by the user's finger. When the wheel body 21 is rotated, the mouse device 1 issues a corresponding control signal.

Figure 5:
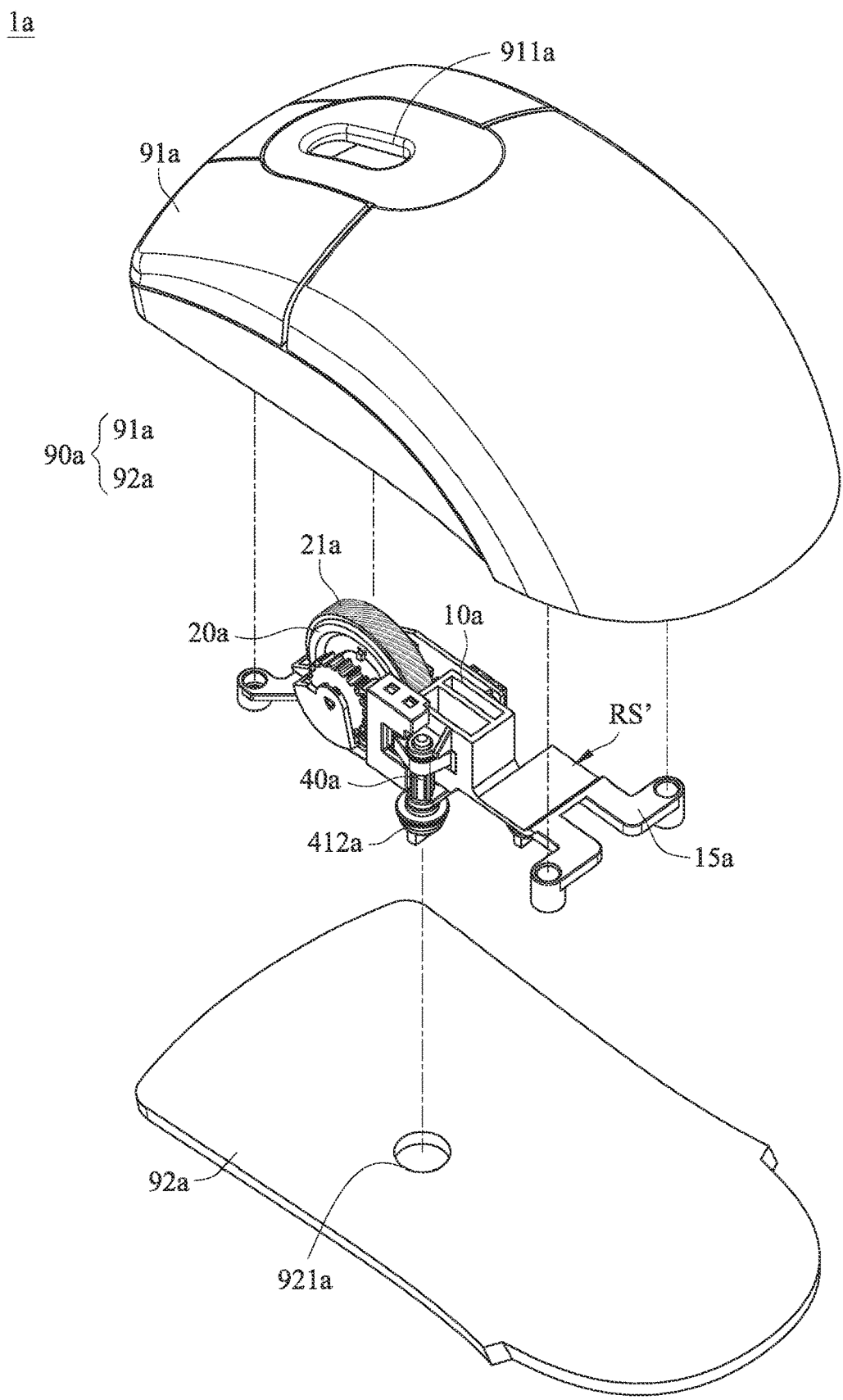
FIG. 5 is a schematic exploded view illustrating a mouse device according to a second embodiment of the present invention.

Please refer to FIG. 5. FIG. 5 is a schematic exploded view illustrating a mouse device according to a second embodiment of the present invention. In this embodiment, the mouse device 1' comprises a casing 90a and a wheel control mechanism RS'. The functions and structures of the components of the mouse device 1a that are similar to those of the mouse device of the first embodiment are not redundantly described herein. In comparison with the first embodiment, the wheel control mechanism RS' is not equipped with the driving module 50, and the support base 10a is not equipped with the fourth supporting part 14. Moreover, the adjusting part 412a of the second magnetic module 40a has a knob structure, and the lower cover 92a comprises an adjusting hole 921a corresponding to the adjusting part 412a. After the upper cover 91a and the lower cover 92a are combined together, the adjusting part 412a (i.e., the knob structure) is exposed outside the adjusting hole 921a. Consequently, by manually rotating the adjusting part 412a, the user can adjust the position of the second magnetic module 40a. Consequently, the wheel body 21a of the wheel module 20a can be rotated in the non-tactile manner or the multi-tactile manner.

From the above descriptions, the present invention provides the wheel control mechanism. In the wheel control mechanism, the rotating mode of the wheel module is adjusted according to the interaction between the first magnetic module and the second magnetic module in a non-contact manner. Consequently, the wheel body of the wheel module can be rotated in the non-tactile manner or the multi-tactile manner. When compared with the conventional technology of using the contact-type interference method to adjust the rotating mode of the wheel module, the interaction between the first magnetic module and the second magnetic module in the non-contact manner can not only switch the rotating mode of the wheel module more quickly, but also reduce the wear condition of the wheel module. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:
1. A wheel control mechanism for a mouse device, the wheel control mechanism comprising:
a support base comprising a first supporting part, a second supporting part and a third supporting part, which are combined together;
a wheel module rotatably installed on the first supporting part, and comprising a wheel body and a metal ratchet, wherein the wheel body comprises a rotary shaft, the metal ratchet is connected with the rotary shaft, and the metal ratchet is synchronously rotated with the wheel body;

a first magnetic module installed on the second supporting part, and comprising a first magnetic element, a first magnetic conductor and a second magnetic conductor, wherein the first magnetic element is arranged between the first magnetic conductor and the second magnetic conductor, and each of the first magnetic conductor and the second magnetic conductor comprises a first end and a second end opposed to the first end, wherein the first end of the first magnetic conductor and the first end of the second magnetic conductor are aligned with a periphery region of the metal ratchet, and a magnet accommodating space is formed between the second end of the first magnetic conductor and the second end of the magnetic conductor; and a second magnetic module comprising an adjustment element, a swinging element, a second magnetic element and a third magnetic element, wherein the adjustment element is pivotally coupled to the third supporting part, the swinging element is connected with the adjustment element and aligned with the magnet accommodating space, the second magnetic element is installed on an end of the swinging element away from the adjustment element, and the third magnetic element is installed on another end of the swinging element away from the adjustment element, wherein the second magnetic element and the third magnetic element are swingable along a same path, wherein when the adjustment element drives the swinging element to swing, the second magnetic element and the third magnetic element are selectively introduced into the magnet accommodating space or departed from the magnet accommodating space, wherein if the second magnetic element is introduced into the magnet accommodating space and like poles of the second magnetic element and the first magnetic element face each other, magnetic attractive forces generated at the first end of the first magnetic conductor and the first end of the second magnetic conductor attract the metal ratchet, so that a rotation of the wheel body results in a tactile feel, wherein if the third magnetic element is introduced into the magnet accommodating space and unlike poles of the third magnetic element and the first magnetic element face each other, the magnetic attractive forces generated at the first end of the first magnetic conductor and the first end of the second magnetic conductor are attenuated, so that the rotation of the wheel body does not result in the tactile feel.

2. The wheel control mechanism according to claim 1, wherein the periphery region of the metal ratchet has a toothed structure, and the toothed structure comprises plural convex parts and plural concave parts, wherein the plural convex parts and the plural concave parts are alternatively arranged on the periphery region of the metal ratchet.

3. The wheel control mechanism according to claim 2, wherein the first end of the first magnetic conductor and the first end of the second magnetic conductor comprise claw structures, and the claw structures are aligned with the corresponding convex parts.

4. The wheel control mechanism according to claim 1, wherein the first magnetic conductor and the second magnetic conductor are silicon steel sheets.

5. The wheel control mechanism according to claim 1, wherein the first magnetic element, the second magnetic element and the third magnetic element are strong magnets.

6. The wheel control mechanism according to claim 1, wherein the adjustment element comprises a shaft part and an adjusting part, wherein the adjusting part is connected with a first end of the shaft part, and the swinging element is radially connected with a second end of the shaft part, which is opposed to the first end of the shaft part, wherein through the shaft part, the adjusting part drives the swinging element to swing.

7. The wheel control mechanism according to claim 6, wherein the third supporting part comprises a support structure, wherein the support structure is externally protruded from a side of the third supporting part, and the shaft part is penetrated through the support structure.

8. The wheel control mechanism according to claim 7, wherein the third supporting part further comprises an avoidance recess, and the avoidance recess is concavely formed in a side of the support structure, wherein the avoidance recess is aligned with the swinging element, and the swinging element is permitted to be received within the avoidance recess.

9. The wheel control mechanism according to claim 6, wherein the mouse device comprises a casing, wherein the casing comprises an upper cover and a lower cover, which are combined together.

10. The wheel control mechanism according to claim 9, wherein the adjusting part has a knob structure, and the lower cover comprises an adjusting hole corresponding to the adjusting part, wherein the knob structure is exposed outside the adjusting hole.

11. The wheel control mechanism according to claim 9, wherein the support base further comprises at least two fixing parts, and the at least two fixing parts are fixed on the lower cover.

12. The wheel control mechanism according to claim 9, wherein an operation end of the upper cover has an opening corresponding to the wheel body, wherein a portion of the wheel body is exposed outside the opening.

13. The wheel control mechanism according to claim 6, wherein the adjusting part is an adjusting gear.

14. The wheel control mechanism according to claim 13, wherein the wheel control mechanism further comprises a driving module, wherein the driving module comprises a driving motor and a transmission gear set, and the transmission gear set is connected with the driving motor, wherein the transmission gear set is engaged with the adjusting gear to drive the adjustment element.

15. The wheel control mechanism according to claim 14, wherein the support base further comprises a fourth supporting part beside the third supporting part, and the driving module is installed on the fourth supporting part.

16. The wheel control mechanism according to claim 15, wherein the fourth supporting part comprises an accommodation recess, and the driving motor is accommodated within the accommodation recess.

17. The wheel control mechanism according to claim 14, wherein the wheel control mechanism further comprises a rotating speed detector that detects a rotating speed of the wheel body, wherein the metal ratchet and the rotating speed detector are respectively installed on opposite sides of the wheel body.

18. The wheel control mechanism according to claim 17, wherein the rotating speed detector is electrically connected with the driving module, wherein the second magnetic element or the third magnetic element is selectively introduced into the magnet accommodating space by the driving module according to the rotating speed of the wheel body.

19. The wheel control mechanism according to claim 1, wherein the second supporting part comprises an installation recess and a covering plate, wherein the first magnetic module is disposed within the installation recess, and the installation recess is covered by and combined with the covering plate.

20. The wheel control mechanism according to claim 19, wherein the covering plate comprises a notch corresponding to the magnet accommodating space.

* * * * *